US005811176A

United States Patent [19]

Locati

[11] Patent Number: 5,811,176

[45] Date of Patent: Sep. 22, 1998

[54] SUBSTANTIALLY LATTICE-LIKE COMPOSITE MATERIAL HAVING A LARGE PERCENTAGE OF OPEN SPACES AND METHOD OF MAKING IT

[76] Inventor: Giuseppe Locati, Via S. Andrea 7, 20052 Monza (Milan), Italy

[21] Appl. No.: 662,130

[22] Filed: Jun. 12, 1996

[30] Foreign Application Priority Data

Jun. 23, 1995 [IT] Italy ................................ MI95A1345

[51] Int. Cl.[6] ...................................................... B32B 27/14

[52] U.S. Cl. ......................... 428/198; 156/62.2; 156/196; 156/305; 264/109; 264/119; 427/212; 427/389.9; 427/393; 427/422; 428/308.8; 428/317.1; 428/317.7

[58] Field of Search .................................... 156/62.2, 196, 156/305; 264/109, 119; 427/212, 389.9, 393, 422; 428/308.8, 317.1, 317.7, 198

[56] References Cited

U.S. PATENT DOCUMENTS

| | | | |
|---|---|---|---|
| 5,436,069 | 7/1995 | Winterowd et al. | 428/308.8 |
| 5,482,574 | 1/1996 | Goldstein . | |
| 5,554,429 | 9/1996 | Iwata et al. | 428/317.1 |
| 5,629,083 | 5/1997 | Teodorczyk | 428/317.1 |

FOREIGN PATENT DOCUMENTS

| | | |
|---|---|---|
| 409525 | 1/1991 | European Pat. Off. . |
| 2580684 | 10/1986 | France . |
| 2622294 | 12/1977 | Germany . |
| 3602381 | 7/1987 | Germany . |
| 1267918 | 3/1972 | United Kingdom . |

*Primary Examiner*—James J. Bell

*Attorney, Agent, or Firm*—Shlesinger, Fitzsimmons & Shlesinger

[57] ABSTRACT

A method of making a substantially lattice-like composite material having a large percentage of open spaces comprises the steps of disposing generally elongate and flexible strips in a randomly-oriented chaotic mass; atomizing a liquid bonding substance into the mass; carrying out a mass-forming process involving volume reduction to make a lattice-like structure of a large percentage of open spaces, in a desired shape; hardening the bonding substance. Thus a substantially lattice-like material having a high percentage of open spaces is achieved, which is formed of a plurality of generally elongate and flexible strips disposed in a randonly-oriented chaotic mass, the strips being bonded to each other at discrete points in the mass. This material can be manufactured to advantage starting from waste materials, such as paper and wood chips, and it can be formed into sheets and panels of flat shape or of different conformations to make packages and the like.

23 Claims, 1 Drawing Sheet

SUBSTANTIALLY LATTICE-LIKE COMPOSITE MATERIAL HAVING A LARGE PERCENTAGE OF OPEN SPACES AND METHOD OF MAKING IT

BACKGROUND OF THE INVENTION

The present invention relates to a process for producing a lattice-like-structure material starting from waste materials such as waste paper, straw, wooden shavings, plastics and so on.

In the known art processes for reuse of waste materials in producing panels or the like have been proposed. Fragments or chips of waste materials containing or mixed with bonding agents and then compressed to form compact panels are usually employed.

EP-A-409 525 for example, discloses a method of obtaining paperboard from a layer of pasteboard particles, that is paperboard coated with a thermoplastic material film. The particles, finely broken up, are hot-compressed so that the coating film melts and causes bonding of the particles together. By this method however only pasteboards can be recycled and in addition no adjustment of the density of the obtained sheets is possible, since compression needs to be always to the maximum degree in order to ensure a mutual adhesion of the broken-up particles and cause the material. forming the adhesive to flow through the inert substances.

GB 1,267,918 describes a method of making panels by mixing wood or paper particles and thermoplastic material fragments and heating and compressing the obtained mixture.

In this case too, panels thus achieved are compact and compression must be sufficiently high, so as to ensure a complete mutual adhesion of the fragments.

DE 26 22 294 discloses a panel consisting of a core made of hemp, linen, straw material etc. mixed with a binding resin, made compact and coated with a layer of wooden shavings to simulate a wood panel.

EP 617 177 discloses a method of making an insulating panel in which paper and paperboard strips and thermoplastic material are mixed together, then the mixture is heated and compressed to make the panel, these operations having the same requirements as EP-A-409 525.

The known-art examples always refer to the manufacture of panels or sheets of a relatively high density, in which the component particles are subjected to a compression action capable of bringing the largest possible surfaces thereof into mutual contact and causing spreading of the adhesive or bonding agent.

In general, the bonding material, by its hardening, embodies the true bearing structure, in which the waste material is only used for the purpose of reducing the amount of hardening material needed for filling up the whole panel volume.

In spite of the above, in order that a sufficient cohesion of the employed waste material may be achieved, usually a high amount of hardening materials need to be supplied, which makes pollution problems and/or the subsequent recycling of the obtained products still worse.

The panels or sheets made following the known-art methods have mechanical features essentially depending on the type of material used for the accomplishment of same and they remain unchanged when the same material is used.

A general object of the present invention is to produce a material of low weight density, compared with the weight density of its component materials, while offering a method of manufacturing elements of recycled material which enables a minimum use of bonding agent, allows the achievement of elements having different mechanical features depending on the forming step, and in which the mechanical features can vary from a high pliability, useful when soft packaging elements are to be made, to a relative stiffness, useful for making bearing elements, still with a minimum supply of plastic material and bonding agents or glues.

SUMMARY OF THE INVENTION

In view of the above object, in accordance with the invention, a method of making a substantially lattice-like composite material having a large percentage of open spaces has been provided, which comprises the steps of:

- disposing generally elongate and flexible strips in a randomly-oriented chaotic mass;
- atomizing a liquid bonding substance into the mass;
- carrying out a. mass-forming process involving volume reduction to make a lattice-like structure having a large percentage of open spaces, in a desired shape;
- hardening the bonding substance.

Thus, in accordance with the above method, a substantially lattice-like composite material having a large percentage of open spaces can be obtained which is formed of a plurality of generally elongate and. flexible strips disposed in a randomly-oriented chaotic mass, the strips being glued or bonded to each other at discrete points in the mass.

BRIEF DESCRIPTION OF THE DRAWINGS

For better explaining the innovatory principles of the present invention and the advantages it offers over the known art, a possible embodiment of the invention practising said principles will be given hereinafter, by way of non-limiting example, with the aid of the accompanying drawings. In the drawings.

DETAILED DESCRIPTION OF THE INVENTION

Figure 1:
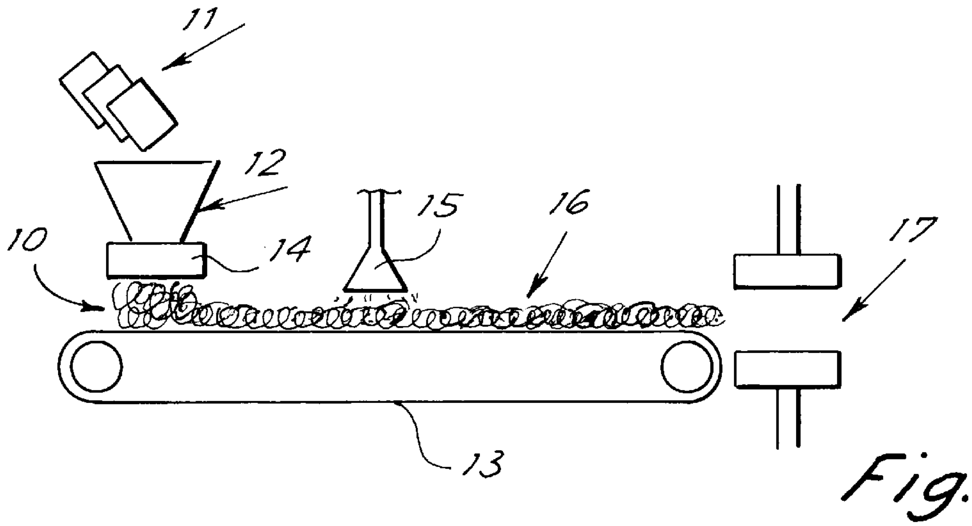
FIG. 1 is a diagrammatic view of an installation carrying out the process steps according to the invention.

With reference to the drawings, diagrammatically shown in FIG. 1 are the different production steps of a material generally in the form of a sheet for example (that is a material in which thickness has a greatly more reduced value than the other dimensional measures) in accordance with the present invention.

In a first production step, a plurality of elongate flexible strip elements are formed, that is comparatively long elements with respect to the other dimensions (by comparatively long elements being meant a length-to-other dimension ratio of at least three to one). Typically, the strip width can be close to one millimetre, and its thickness approximately one millimetre as well, or fractions thereof.

The material. from which the strips are to be obtained is made to advantage of natural fibres. For instance, the strip elements 10 can be produced by cutting waste materials or materials to be recycled, such as paper or paperboard sheets 11, using known cutters 12 or can be formed of differently-produced straw material, wooden shavings, etc.

In addition to obtaining strips by expressly cutting sheet materials, waste materials already in the form of strips as resulting from usual industrial workings may be also used, such as scraps from paper trimming, wood working or the like, for example. Strips can also be obtained from elongate elements of indefinite length such as straw, very long paper trimmings and the like. Obviously strips of different origin and material can be employed together, being variously mixed with each other.

The strips, of a width in the order of one millimetre for example, and some centimetres long, are disposed so as to form a chaotic mass or layer, that is they are confusely entangled, being for example spread on a movable belt 13 running under a distributor 14, to form a "mattress" or layer of entangled strips 16, having a large percentage of open spaces at the inside thereof. The mass must be weakly compacted so that it can be passed through by an air stream containing atomized fluid substances. The means for achieving a good entanglement and/or curling of the strips obviously also depends on the type and origin of the material. For instance, if wood or paper chips are used, they are likely to be already strongly curled due to their own nature and therefore a weak mixing is sufficient. The use of any known means for making or promoting waving, curling and mixing of the strips may be also envisaged, such as known geared means for example.

The thus formed layer is sprayed with a finely atomized bonding agent. The bonding agent can be a true glue in a liquid state for example or an equivalent plastic compound capable of hardening. Atomization is such carried out that the atomized substance is substantially sprayed over the whole surface of the strips forming the "mattress", without however soaking the strips to such an extent as to cause an important smashing of them, due to a too great amount of bonding agent used.

Atomization can be obtained by a suitable sprayer or sprayer unit 15, within the range of action of which the conveyor belt 13 is made to run, After atomization of the bonding agent, a forming operation is carried out on layer 16 so as to give said layer the desired final shape depending on the intended use thereof.

The forming operation can be carried out by a known forming machine 17 for example, such as a press having flat or conveniently shaped forming dies and provided for obtaining sheets or thicker masses, depending on requirements.

Unlike the known art, by the method of the invention a material is obtained which has a typically lattice-like structure, with a large percentage of open spaces (the open space-solid portion ratio being of 50% at least), in which lattices are formed of lengths of strips having discrete contact points mutually bonded. The bonding agent atomization onto the strips further aids in increasing the structure strength, the bonding agent forming a coating film over the strip surface that, when hardened, improves the mechanical features of said structure.

By selecting bonding agents having appropriate characteristics, the features of the finished product can be modified depending on requirements. For example, by the use of flexible glues (that. is of substantially the same stiffness as the strips themselves after drying), such as vinyl resin glues, flexible products can be obtained, such as packaging sheets, whereas if stiff glues are used (that is of greater stiffness than the strips, after drying) such as silicate-based glues or starch pastes, products of relatively high stiffness can he produced, such as sheets for making boxes, cases, or preformed trays for packages, etc.

Figure 4:
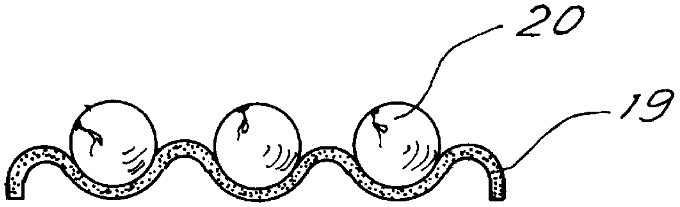
FIG. 4 is a diagrammatic view of an example of a third use of a material according to the invention.

Shown in FIG. 4 is for example a packing box made by bending sheet material manufactured in accordance with the invention, and intended for having enough stiffness to replace the traditional corrugated cardboard. The box may also contain partitions or linings, made of a material in accordance with the invention which may also have a different density than the material of the box. The large percentage of open spaces in the material also enables the achievement of boxes with linings and partitions having good thermal-insulation features.

By the method of the invention products of a specific weight varying between 35 kg/m3 and 70 kg/m3 can be easily obtained.

The required amount of bonding agent can be very reduced, which helps in making the production process and the obtained material cheap. By way of example, when producing materials starting from paper strips, a bonding-agent amount even as low as 20 kg per cubic metre of mass to be formed has appeared as sufficient.

The lattice-like material obtained by the method of the invention can be cut into the most different shapes, depending on requirements. In addition, the lattice-like structure can be more or less pressed during the forming step so as to alter the material density. Furthermore, a more or less heavy and soft material can be obtained.

Squashing during the formation step may also be different at different points of the material, so as to obtain density variations at predetermined points, e.g. to have thicker and softer areas alternated with thinner and stiffer areas.

Figure 2:
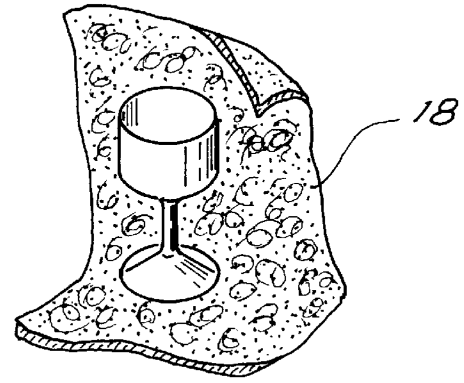
FIG. 2 is a diagrammatic. view of an example of a first use of a material according to the invention.

By way of example, shown in FIG. 2 is a flexible and relatively soft thin sheet 18, obtained by a limited forming pressure and with the use of a flexible glue, so that it can be used for wrapping and packaging brittle objects.

Figure 3:
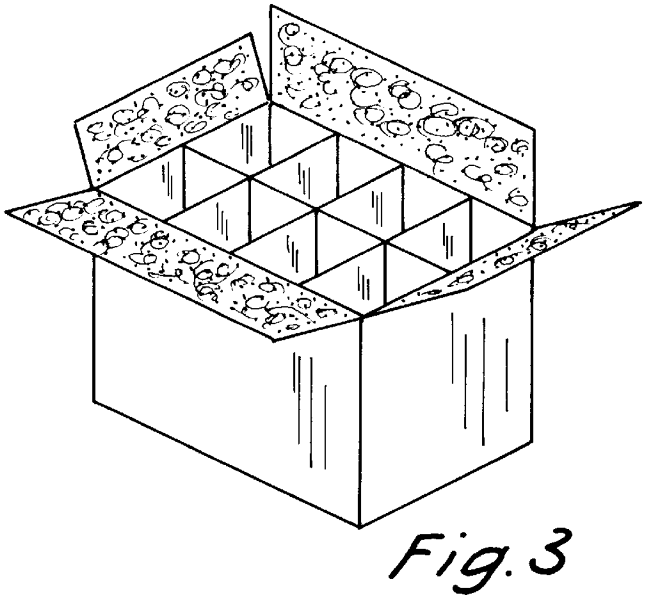
FIG. 3 is a diagrammatic view of an example of a second use of a material according to the invention.

Shown in FIG. 3 is a preformed tray 19, which may be used as a bottom in a box for transportation of fruit, for example. This tray is made using relatively stiff glues and during the forming step has been sufficiently pressed so as to obtain a relatively stiff structure. The tray may also be made stiff enough to be directly used as a closing bottom for the box, in which case the preformed bottom is provided with conveniently-sized wells for holding the products 20.

At this point it is apparent that the intended purposes have been achieved, as a method has been provided which enables the manufacture of a cheap material, even starting from waste products, which is adapted for a wide number of uses and has features of good solidity, strength and shock-absorption, together with a good thermal and acoustic insulation, and is capable of taking any shape, from that of a preformed packing box to that of a stiff or flexible sheet.

The material of the invention can easily replace corrugated cardboard, foamed polistyrene or similar materials in making containers, packaging elements, etc. offering low costs and ensuring a greater protection of the natural environment, since recycled natural fibres or natural fibres adapted for recycling are mainly used.

The material can be preformed, in the form of shells even of high thickness for example, for receiving objects to be packaged.

Obviously, the above description of an embodiment applying the innovatory principles of the present invention is given by way of example only and therefore is not to be interpreted as a limitation of the scope of the invention as herein claimed.

For example, if the manufacture of a continous sheet is wished, known forming rollers can be utilized, which are disposed facing each other by pairs, the sheet to be formed running between each pair of rollers so that the desired pressure is exerted on the material and a sheet of the required consistency is manufactured.

The sheets can also be of any shape and, if required, flat layers can be optionally covered with paper sheets or uncurled strips to provided a continuous surface. If a high softness is required, the process to which the material is submitted after the bonding-agent spraying may be an operation intended for smoothing and levelling the free faces of the sheet, without substantially pressing the mass. Additional finishing operations may be also conceived, such as sterilizing, dying, decorating operations and others.

What is claimed is:

1. A method of making a substantially lattice-like composite material having a large percentage of open spaces, comprising the steps of:

disposing generally elongate and flexible strips in a randomly-oriented chaotic mass;

executing curling of the strips;

atomizing a liquid bonding substance into the mass;

carrying out a mass-forming process involving volume reduction to make a lattice-like structure having a large percentage of open spaced, in a desired shape; and hardening the bonding substance.

2. A method according to claim 1, characterized in that at least part of the strips is obtained by cutting sheet material.

3. A method according to claim 1, characterized in that at least part of the strips is obtained by chip removal, in particular from wood.

4. A method according to claim 1, characterized in that at least part of the strips is obtained by cutting elongate elements of indefinite length such as straw and the like.

5. A method according to claim 1, characterized in that the strips have a length-to-width ratio of at least three to one.

6. A method according to claim 5, characterized in that the strips are of a length in the region of centimetres, a width in the region of millimetres and a thickness in the order of one millimetre or fractions thereof.

7. A method according to claim 1, characterized in that at least part of the strips is formed of a material containing natural fibres.

8. A method according to claim 7 characterized in that the material of which the strips are made out is paper.

9. A method according to claim 1, characterized in that the bonding substance after hardening has a stiffness substantially comparable to that of the strips.

10. A method according to claim 9, characterized in that the bonding substance is a vinyl resin glue.

11. A method according to claim 1, characterized in that the bonding substance after hardening has a greater stiffness than the strips.

12. A method according to claim 11, characterized in that the bonding substance is a silicate-based glue.

13. A substantially lattice-like composite material with a large percentage of open spaces, formed of a plurality of generally elongate and flexible strips disposed in a randomly-oriented chaotic mass, the strips being bonded or glued to each other at discrete points in the mass, and characterized in that in the strips the length-to-width ratio is at least three to one.

14. A material according to claim 13, characterized in that the strips have a surface coated with a bonding surface.

15. A material according to claim 13, characterized in that the strips are of a length in the order of centimetres and a width in the order of one millimetre.

16. A material according to claim 13, characterized in that at least part of the strips is formed of a material containing natural fibres.

17. A material according to claim 16, characterized in that at least part of the strips consists of paper.

18. A material according to claim 16, characterized in that at least part of the strips consists of chips, in particular wooden chips.

19. A material according to claim 13, characterized in that the strips are bonded to each other by a bonding substance the stiffness of which is substantially comparable to that of the strips.

20. A material according to claim 19, characterized in that the bonding substance-is a vinyl resin glue.

21,. A material according to claim 13, characterized in that the strips are bonded to each other by a bonding substance of a greater stiffness than the strips.

22. A material according to claim 21, characterized in that the bonding substance is a silicate-based glue.

23. A material according to claim 13, characterized in that it is in the form of a sheet.

* * * * *